May 5, 1970 W. G. MORDAUNT ET AL 3,510,618

GRAVITY INSENSITIVE MERCURY CONTACTOR SWITCH

Filed Dec. 29, 1967

*INVENTORS.*
WALTER G. MORDAUNT
CARTER ROBERTSON
BY
George C. Sullivan
Agent

United States Patent Office 3,510,618
Patented May 5, 1970

3,510,618

GRAVITY INSENSITIVE MERCURY CONTACTOR SWITCH

Walter G. Mordaunt, San Jose, and Carter Robertson, Glendale, Calif., assignors to Lockheed Aircraft Corporation, Burbank, Calif.

Filed Dec. 29, 1967, Ser. No. 694,674
Int. Cl. H01h *29/00*
U.S. Cl. 200—152 4 Claims

ABSTRACT OF THE DISCLOSURE

A mercury switch and switching concept utilizing both "mercury to mercury" reservoirs and mercury to metal as contact elements encompassing the utilization of both rotationally and/or linearly positionable electrical contactor elements.

This invention relates generally to the field of electrical switching and is particularly directed to a mercury switch concept and to the structure embodying such concept which incorporate linear and/or rotationally positionable mercury contact reservoirs.

In the past, mercury switches have been provided which use pools of mercury which are introduced down into and up away from larger pools or reservoirs of this material so as to effect and diseffect an electrical continuity. Such switches have been limited to vertical operation in gravity environments. Further, these prior art switches have been limited in their effective utility because of the fact that they were generally bulky and were not programmable so as to be automatically or manually sequenced to provide a series of electrical contacts which could then actuate various types of associated circuitry.

It is a primary object of this invention to provide a mercury switch which is operable in a zero gravity environment.

A further object is to provide such a switch which is not dependent upon a particular attitude orientation and may be inverted, vibrated, shocked, subjected to G loadings or acceleration loads, and which has long life and little or no electrical noise associated with its use.

A further object of the invention is to provide a mercury switch which is programmable so that a number of mercury pools or mercury to metal contacts may be effected sequentially so as to program a series of electrical transactions.

It is a further object of the invention to disclose a mercury switch which is adaptable to switching circuits having heavy inductive loads and in which a construction of a plunger assembly moving into and out of a mercury pool causes an arc to be "wiped off" by a suitable sleeve bearing.

Still further objects of the invention are to provide a device which is of smaller size than comparably rated devices of other types and which is adaptable to mass production techniques.

Figure 1:
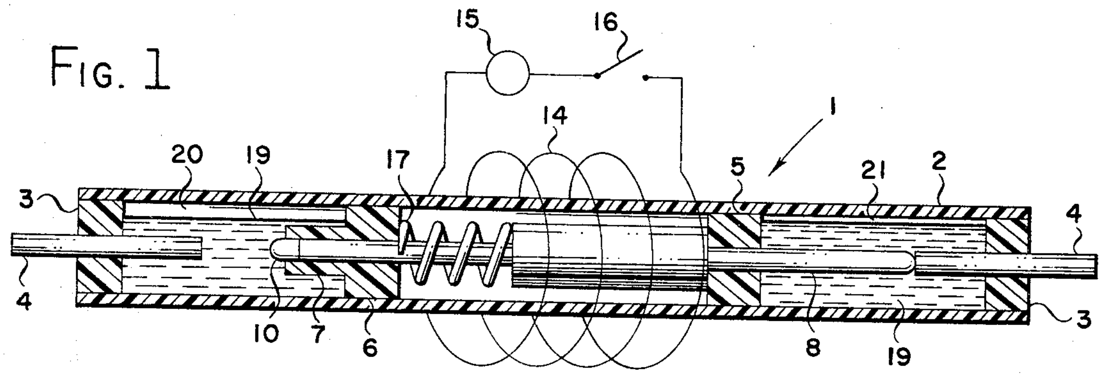
Figures 2, 3, 4, 5:
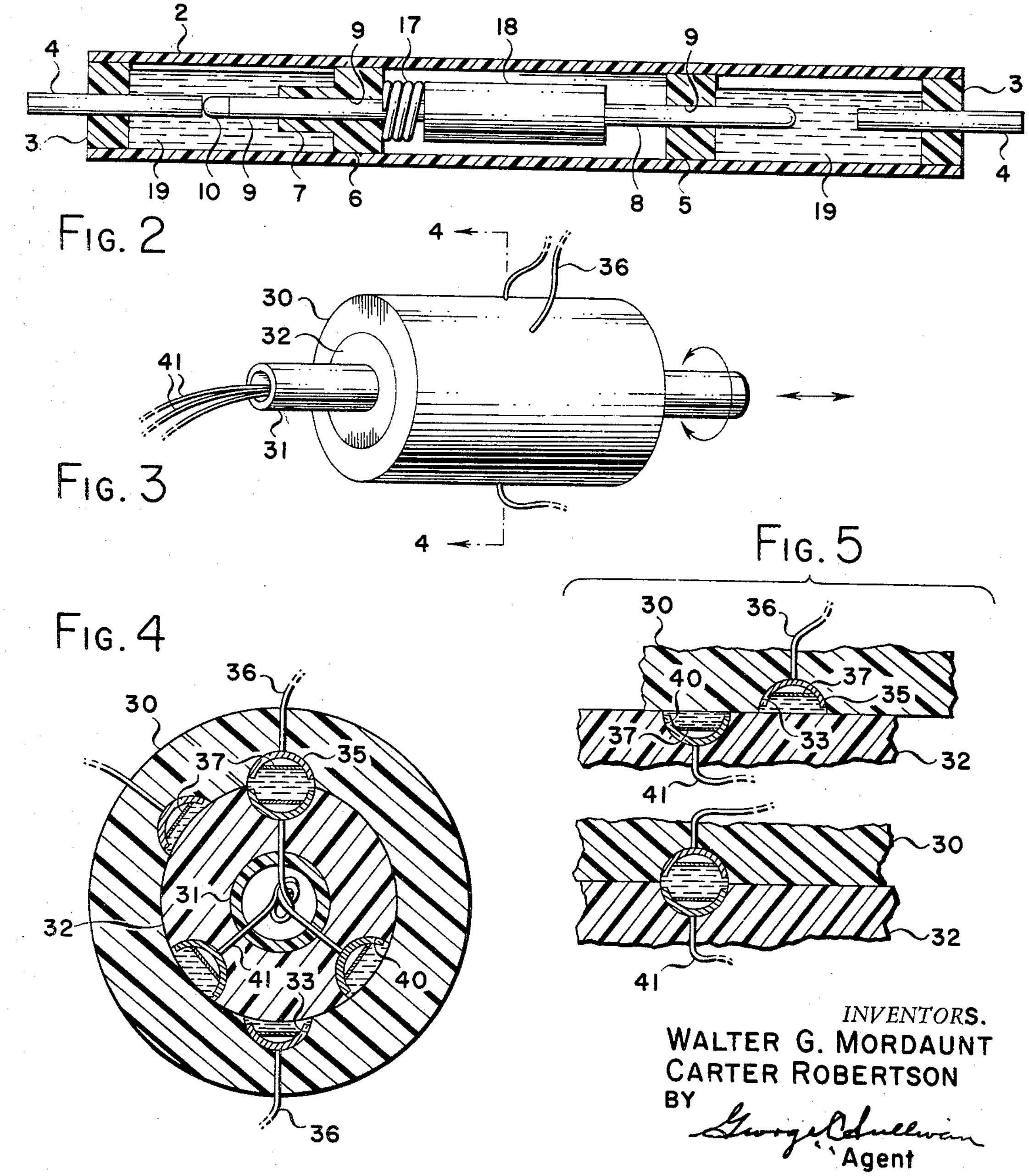

These and other objects of the invention will become apparent to those familiar with and skilled in the art when considered in connection with the following description and figures wherein:

FIG. 1 shows a linearly actuable mercury switch in an "open" circuit position,

FIG. 2 shows such a switch in an actuated or "closed" position for the transmission of electric current, FIG. 3 is an orthographic view of a mercury switch constructed in accordance with the invention which is both linearly and rotatably actuable, FIG. 4 is a cross-section view of the switch mentioned in FIG. 3, and FIG. 5 schematically depicts the manner of operation of a programmable mercury switch involving a plurality of electrical contacts.

Turning now to FIG. 1 it will be seen that a mercury switch is generally indicated at FIG. 1 which is shown to comprise a cylindrical housing 2 which is preferably circular in cross section and which is provided at either end thereof with closure plugs 3 through which are sealingly mounted electrodes 4.

Located within cylindrical housing 2, and medially of the ends thereof, are a pair of insulative bearings 5 and 6, it being noted that insulative bearing 6 is preferably provided with a projection 7 associated therewith. Bearings 5 and 6 are preferably of "self-lubricative" material such as Teflon, nylon, self-lubricative ceramic or the like which will maintain a sealed relationship with the cylindrical housing 2 yet which will allow the passage therethrough of plunger elements which will be hereinafter described.

Located within said cylindrical housing 2 and between the insulative bearings 5 and 6 is a conductive rod 8 which is extended in a journalled relationship through apertures 9 within said insulative bearings 5 and 6. It is noted that rod 8 is of greater length than the distance between insulative bearings 5 and 6 and extends at both ends thereof through the bearings in the manner shown. One end of rod 8 has associated therewith an insulative tip 10 which is bonded or affixed in any conventional manner to the conductive rod 8. A solenoid 14 is provided in a suitable housing, not shown, surrounding and associated with cylindrical housing 2 which is associated with appropriate battery and switch means 15 and 16, respectively.

A spring 17 is coaxially mounted upon conductive rod 8 and is adapted to impinge against insulative bearing 6 at one end, and at the other end against a suitable armature 18 in such a way that armature 18 is normally biased toward and preferably in contact with insulative bearing 5. Solenoid 18 is physically attached to, and may be integral with depending upon the selection of materials required, rod 8. Into the annular chambers 20 and 21 defined between closure plugs 3 at either end of cylindrical housing 2 and the insulative bearing members 5 and 6 is intrroduced a conductive fluid, preferably mercury or the like. It is noted that chamber 21 is essentially filled with the conductive fluid 19 so that a continuous electrical relationship is maintained between electrode 4 and its associative end of rod 8, it being understood that electrical current may flow across and through the fluid 19 which is in contact with both electrode 4 and rod 8.

Chamber 20 is likewise essentially filled with conductive fluid 19, it being noted that both chambers 20 and 21 are filled to capacity minus that portion of their capacity which is equal to the volume displaced as rod 8 moves into and out of the chambers 20 and 21, thus displacing conductive fluid 19 in each of these chambers.

Desirably, the space in the chambers 20 and 21 which is the difference between the total internal capacity of the chambers and the portion of the chambers represented by the volume selectively taken up by insertion and withdrawal of the ends of rod 8 thereinto are preferably "backfilled" with an inert gas such as hydrogen or nitrogen so as to prevent oxidation of mercury and to provide the mercury from fractionating or "scattering" under vibration, shock, or zero G conditions. Alternatively, a slight compression effected on the conductive fluids 19 within chambers 20 and 21 can be effected by a second piston adapted to be mounted around rod 8 on one end and projection 7 at the other and adapted to be separated from insulative bearings 5 and 6 with a suitable spring.

In operation, an electric current is applied across solenoid winding 14 which in a manner commonly understood reacts with the armature 18 to selectively cause the armature to move into and out of the area of primary electrical influence created by the passage of current through winding 14. This action is effected against the bias of spring 10 which normally causes the insulative tip end 10 of rod 8 to be retracted into projection 7 on insulative bearing 6 so that the electrically conductive portion of rod 8 is thus taken out of contact with mercury reservoir 19. Upon actuation, armature 18 carrying conductive rod 8 with it would be caused to be introduced into the reservoir 19 so that the mercury would thus be in an electrically associative relationship with the conductive rod and current would pass between the end of rod 8 and electrode 4 thus completing a circuit through the mercury switch assembly. Obviously, the biasing of this plunger may be reversed so as to effect a normally closed switch.

It is noted that the tolerances of the rod 8 and the internal aperture 9 through bearing 6 are such that a very close relationship between these two parts is maintained and this coupled with the inherent lubricative properties of such material as Teflon would cause a "wiping" action to take place as rod 8 is withdrawn from mercury pool 19 in such a manner that as the insulative tip 10 is withdrawn into the insulative projection 7, electric current would be effectively prevented from flowing.

FIGS. 3, 4 and 5 show a modified version of a mercury switch which may be incorporated into a mercury switch as shown in FIGS. 1 and 2 or which, alternatively, may be effected as a separate mercury switch.

In this embodiment, an insulative housing 30 is provided which is preferably circular in cross section and which is provided with an insulative plunger element 31 which is extendable coaxially therethrough. As desired, plunger 31 may be provided with an enlarged central section 32. It is noted that tolerances for the interfitting of plunger 31/32 within housing 30 are quite close so as to provide a "wiping" type of contact or an interengagement between the two members. These insulative housing and plunger members are preferably formed of materials which have inherently lubricative properties such a Teflon, nylon, or the like.

Srtategically located on the inner peripheral surface of insulative housing 30 are a multiplicity of reservoirs or pools 33 which are preferably generally hemispherical in shape and which are preferably lined with conductive metal liners 35 to which are electrically attached suitable conductors 36. Preferably, liners 35 do not extend completely to the "rim" presented by the interface of the hemispherical reservoir with the internal cavity within insulative housing 30 so as to provide for a more smooth electrical continuity with utilization of conductive fluid as will be more particularly hereinafter described.

Adapted to electrically and selectively cooperate with pools 33 on the inner surface of housing 30 are a plurality of associative reservoirs 40 formed much in the manner of pools 33 adapted to contain conductive fluid such as mercury. In a similar manner, these reservoirs 40 are provided with metallic liners which are connected to suitable electric conductors 41 which may be suitably brought out through the insulative plunger 31.

As shown in FIGS. 4 and 5, the reservoirs 33 and 40 may be provided with diaphragms 37 which may be any flexible material compatible with mercury or may be "bellows like" in configuration. The mercury "pools" as located on one side of these diaphragms and a biasing means (which may be either a mechanical spring or a gaseous fluid) may be located on the other in order to provide a means of keeping the conductive fluid from splattering or fractionation under zero G, shock or vibration stress. Obviously such biasing means may be applied to either or both cooperating reservoirs.

In a manner which will best be understood by reference to FIGS. 4 and 5, as plunger 31/32 is rotated and/or linearly positioned within housing 30, it will be seen that a plurality of electrical continuities may be selected upon the inter-engagement of the reservoirs 40 with pools 33 each containing conductive fluid. As these reservoirs are moved out of registry either linearly or rotatively, or both, it will be seen that a "wiping" action takes place between the inner surface of housing 30 and the outer surface of plunger 32 so as to create an electrical discontinuity. Conversely, as these pools are moved into association with one another, an electrical continuity is established. Obviously, a "programming" may be effected by the mechanical camming or sequencing of the rotation of plunger 30 with respect to housing 32 and/or the linear movement thereof so that a series of electrical circuits are made and broken thus effecting a sequential switching operation. The utility of such devices in such uses as remote control of space vehicles, numerical control systems, lighting installations and a myriad number of other electrical control environments is manifest.

The mercury switch modification shown in FIGS. 1 and 2 may be modified in accordance with the teachings of the invention described in connection with FIGS. 3, 4 and 5 wherein pools or reservoirs of mercury are provided in a rod assembly 8 which would correspond to the (insulative) plunger 31/32, and in which similar pools or reservoirs of mercury are established in the inner surface of an outer housing which would be associated with such a modified rod 8 in place of or in addition to a mercury reservoir 19 as shown.

Having thus described our invention, it would be clear that variations and details of construction may be resorted to without departing from the true spirit and scope of the invention which we desire to be limited only in terms of the accompanying claims.

We claim:

1. An electrical switch comprising
an insulative cylindrical housing,
at least one indentation within the inner surface of said insulative housing,
an electrically conductive liquid substantially filling said indentations,
an insulative plunger movably journalled within said unsulative housing,
the outer surface of said insulative plunger containing at least one indentation,
an electrically conductive fluid substantially filling said indentation,
the electrically conductive liquid filling each of said indentations being electrically connected through said insulative housing and said insulative plunger, respectively, to a point exteriorly of each,
flexible diaphragms in at least some of said indentions separating the inner surfaces thereof from the remainder of the indentions,
biasing means for exerting pressure on said diaphragms so as to bias them outwardly of said indentions,
the outer surface of said insulating plunger being of substantially the same dimension as the inner surface of said insulative housing, whereby the indentations within said plunger and said housing may be selectively brought into registry one with the other in such manner that an electrical circuit may be made and broken as the electrically conductive fluid contained within each of said indentations is brought into and out of inter-registry.

2. An electrical switch as claimed in claim 1 in which said biasing means is gaseous fluid under pressure at least equal to ambient.

3. An electrical switch comprising:
a generally elongated cylindrical insulative housing,
and plug means permanently sealing the outer end portions of said housing,
electrical conductor means sealed within and extending through said plug means with portions of said conductors extending into said housing,
at least two intermediate plug means contained within said housing, each cooperating with said end plug means to define a pair of sealed chambers respectively located at each end of said housing, an electrically conductive fluid contained within said sealed chambers, each of said intermediate plugs containing an aperture, a plunger slidably journalled within said apertures and adapted to reciprocate longitudinally of the housing, at least one end of said plunger containing an insulative tip of the same cross sectional shape as said plunger, the difference in volume between said liquid and said cavities being such as to allow for differences in thermal expansion and the volume of the end portions of said plunger which are selectively introduced into and out of the cavities, an armature journalled on said plunger, biasing means extending between one side of said armature and at least one of said intermediate plugs whereby said plunger is normally biased to a position in which the plunger is out of contact with the electrically conductive fluid in one chamber with the insulative tip insulating the end of the plunger from the conductive fluid, and means mounted exteriorly of said housing for moving said plunger against the force of said biasing means to a point where the insulative tip on one end of said plunger will be extended so as to allow said plunger to electrically connect the conductive fluid in its adjacent reservoir.

4. An electrical switch as claimed in claim 3 in which and intert gas is compressively contained within said chambers.

References Cited

UNITED STATES PATENTS

| | | | |
|---|---|---|---|
| 3,363,205 | 1/1968 | Beck | 335—52 |
| 2,296,194 | 9/1942 | Trautman et al. | 200—152 |
| 2,901,580 | 8/1959 | Kelly | 200—152.9 |
| 3,278,713 | 10/1966 | Grupen | 200—152.9 |
| 3,375,336 | 3/1968 | Tripp | 200—152.9 |

ROBERT K. SCHAEFER, Primary Examiner

H. J. HOHAUSER, Assistant Examiner

U.S. Cl. X.R.

335—52